Patented Sept. 30, 1930

1,776,990

UNITED STATES PATENT OFFICE

WALTER S. BAYLIS, OF LOS ANGELES, CALIFORNIA, ASSIGNOR, BY MESNE ASSIGNMENTS, TO FILTROL COMPANY OF CALIFORNIA, OF LOS ANGELES, CALIFORNIA, A CORPORATION OF CALIFORNIA

PROCESS FOR PREPARING ACTIVATED ADSORPTIVE CLAY

No Drawing.          Application filed September 1, 1927. Serial No. 217,004.

My invention relates to the manufacture of adsorptive materials suited for use in clarifying and decolorizing oils and other liquids, and its principal object is the chemical preparation of a highly efficient adsorptive material from raw material having initially no adsorptive power.

It is common practice to treat oils and other liquids with fuller's earth which has a selective affinity or adsorptive capacity for certain gums and other impurities. This treatment clarifies and decolorizes the liquid, thus greatly improving its commercial value.

I have discovered that it is possible to produce an adsorptive agent which is far more active than fuller's earth, from certain clays which in their natural state are without adsorptive power.

These clays may be conveniently designated by the general term "bentonite" and contain from 55% to 60% of $SiO_2$, from 18% to 30% of $Al_2O_3$, sometimes as high as 3% of $Fe_2O_3$, together with certain small amounts of calcium, magnesium, sodium, and potassium oxides. Chemical analysis of these clays alone will not determine their fitness for activation, which seems to depend in part upon the physical properties of the material.

My investigations of the subject lead me to think that the active, adsorptive, decolorizing constituents of my chemically prepared activated material is a silicate, a substance of the nature of clays in general, but with a relatively low content of basic elements and high in the acid elements, that is, silicic acid. The composition of this substance is very likely of the formula: $R'''_2O_3.R''O.10SiO_2$ with varying amounts of moisture and combined water. $R'''$ is aluminum with a small percentage of iron. $R''$ may be entirely magnesium, though in some cases Ca may be present, and due to the base-exchanging properties of these substances alkalies may partly replace the bivalent metals. The formula could in most cases be written: $Al_2O_3.MgO.10SiO_2$.

This substance is produced, when certain types of clay materials are treated with acid; the most important of this type of clay materials are bentonites, consisting of the mineral $R'''_2O_3.R''O.5SiO_2$, but there are others that respond equally well to the acid treatment, it being necessary to subject any given material to the process of acid treatment in order to ascertain whether they are suitable as raw materials for the production of the highly active adsorptive clays. The bentonites and similar clay substances have no adsorptive capacity in their natural state, a proper process of acid treatment offering the relatively speaking ideal conditions for the transformation of this inactive substance to the active substance, for which a formula has been prepared above.

The natural decolorizing clays contain various amounts of this active substance, more or less contaminated by substances which exert a harmful influence on the adsorptive power of the active substance, and they may also contain at the same time inactive substances of the bentonite type. In treating such materials with acids, the inactive substances are transformed into the active form, and at the same time the harmful contaminations are removed; a considerable increase in the adsorptive capacity of such clays is thus often accomplished, though it seems that the materials of the pure bentonite type, that is, materials totally inactive, produce the most efficient adsorptive clays when treated with acid.

In treating the clays, the most favorable conditions of the treatment for each particular raw material have to be determined, partly by the general characteristics of the clay at hand but mainly by experiments conducted in the laboratory or on a semi-commercial scale. The conditions vary mainly in regard to the intensities of the treatment, which again is dependent on the quantity and strength of acid employed, temperatures, length of time of treatment, and also very likely pressure employed. The more near the inactive, bentonite type the raw material, the more intense the treatment required; in case of clays consisting of natural, active clays, again without any substances of the inactive type to be transformed into the active form, the treatment required is only a mild one, sufficient to remove the harmful impurities present. While the treatment should be intense enough, on the other hand each raw material has its maximum limit in this respect, beyond which too intense a treatment will prevent the formation of the desirable products, or the products already formed being decomposed.

In the following the subject is treated from the viewpoint of the pure, inactive, bentonite type of raw materials, capable of producing the most efficient adsorptive mediums; by "bentonite type" of materials being meant here any raw clay material similar to bentonite as regards its properties as a raw material in producing the highly active, adsorptive, decolorizing mediums.

In regard to the composition of the raw materials, the following should be noted. While the "bentonites", ("bentonite" understood as a general term for bentonite proper and materials of similar properties) may conform strictly to the pure formula of a mineral, the raw clay may contain admixed impurities such as sand, gravel, limestone, gypsum, etc. These should be removed as much as possible by elutriation, the limestone and gypsum especially affecting the results obtained. As regards the pure clay material itself, it should be remembered that the $R''$ in the formula may stand for either Ca or Mg, also the bivalent metals may have been partly replaced by Na or K. Whether the bivalent metals consist mainly of Ca or Mg or have been replaced by alkalies, has a very marked influence on the results obtained in treating such materials. Thus for instance if Ca is absent in the clay substance, that is, relatively speaking, the limit of the maximum strength of acid is lower than in case of clay containing Ca; while the ultimate amount of acid used may be, relatively speaking, equal to the amount of acid employed in case of clays containing Ca, the strength of the acid must be kept much lower than in case of the clay containing Ca or if for any reason a stronger acid is employed, its effect has to be counteracted by using a lower temperature. Thus for example in case of clay from Shoshone, Inyo County, California, of the normal, average composition, the Ca content of the clay substance itself is low, and as is well known this clay is readily damaged if a full amount of acid is used in the initial stage of the process and a high temperature employed; either the temperature has to be lowered in the initial stages of the process or the acid added in small amounts. In case of clay from Chambers, Arizona, the bivalent metals consist mainly of Ca, and the ultimate total amount of acid can be employed right from the beginning of the process together with high temperatures, this being meant as a relative statement only, that is, in comparison to the conditions in case of Shoshone clay. This different behavior is no doubt caused by the fact that $CaSO_4$ is formed in treating the Ca containing clay, which $CaSO_4$, being difficultly soluble in water, deposits itself on the clay particles and protects them from too strong an effect of the acid.

In regard to the intensity of the treatment, in general, it is to be remembered that the conditions on which this depends are to some extent interchangeable; for instance, a certain result obtained with a treating period of, say, 6 hours, may be duplicated by a treatment of 2 hours by increasing the amount of acid employed, etc.; the exact, practical conditions to be employed in each case depending on so many factors and conditions confronted in each particular case that the formulating of a fast, general rule is impossible.

The composition of the clay substance in the raw material is important from another viewpoint, that is, from the viewpoint of the stability of the product obtained and its reactivation possibility. To understand this, it is to be realized that the highly active, adsorptive substance of the formula proposed above, has a delicately balanced structure, readily broken by substances containing strong or fairly strong basic elements such as Na, K, Ca, Mg, etc.; it is therefore necessary that not only the free bases but the salts of these bases be kept away from the active clays in the last stages of their manufacture, when they are used in refining the oils or when they are being reactivated; these harmful substances being especially active at higher temperatures and in the presence of water or its vapors; a highly active clay containing these harmful substances being liable to be entirely ruined, when heated to higher temperatures, when being dried or reactivated for instance, while the same loss of efficiency may take place slowly on standing under ordinary circumstances. In this connection it is to be remembered that while the basic cause of reversion and loss of efficiency on heating to higher temperature can be traced to the presence of these substances mentioned above, the extent of the loss of efficiency is influenced greatly by a number of circumstances, some of which may be entirely overlooked in a superficial review of the facts. Thus two seemingly identical experiments may be made, especially as far as the presence of the harmful ingredients is concerned and yet the result be widely different in regard to the loss of efficiency, in which case the difference in results can be traced to some delicate variation in conditions, affecting the influence of the harmful impurities. These considerations are important in studying the processes for reactivating the spent clays, the stability of the clays on standing, the production of mixed clays, etc., also the base-exchanging properties of these clays are worth keeping in mind in such studies.

To produce stable adsorptive clays which can be reactivated by burning, it is therefore necessary to free the finished product as far as possible of the presence of these harmful ingredients. In case of Mg, Na and K compounds, this is very easy as their sulfates and chlorides are readily soluble in water and are therefore efficiently eliminated during the washing operation when the acid is removed from the treated clay. This is also true in regard to $CaCl_2$ that is, the lime is readily washed off when hydrochloric acid is used in treating the clay, but when sulfuric acid is used, the removal of the $CaSO_4$ formed becomes a problem (in case of clays of a high Ca content) as $CaSO_4$ is only sparingly soluble in water. While the ideal treatment would be to use a comparatively large quantity of acid, thus producing an efficient material, and then washing off every trace of $CaSO_4$ formed, this is hardly economical in practice on account of the large quantities of water required. The best practical results may be obtained with a somewhat smaller quantity of acid with consequently smaller quantities of $CaSO_4$ to be washed off. Considerable research work is therefore necessary in each particular case to determine the practical, economical limits. In this respect it may be mentioned that in manufacturing a brand in which the highest possible reactivation efficiency is desired, some of the initial efficiency may therefore be sacrificed, that is, less acid is used in the treating process, less $CaSO_4$ being formed and consequently the thorough washing of the product thus being made less difficult. In this connection it should be pointed out that work should be undertaken to determine the influence of the Ca left in the clay substance on the reactivation and stability. If it is proved that any Ca (lime) left in the clay substance, that is not converted into $CaSO_4$, does not have any harmful influence in regard to stability and reactivation, then the conditions favoring the least possible transformation of the Ca into $CaSO_4$ should be determined, keeping of course in mind at the same time the desirability of the highest possible efficiency, etc. In general information on the relative influence of Mg, Ca, Na and K on the properties of the finished product might offer valuable assistance in solving the practical problems encountered in working out manufacturing process for various raw materials at hand.

I claim as my invention:

A process of making a chemically prepared activated adsorptive material suited for use in clarifying and decolorizing oils and other liquids which comprises: treating bentonite with acid; and separating the desired product from the water soluble salts produced by the reaction of the acid upon the bentonite, the amount of acid used being sufficient to remove approximately one-half the alumina contained in the principal hydrosilicate of the bentonite.

In testimony whereof, I have hereunto set my hand at New York, New York, this 18th day of August, 1927.

WALTER S. BAYLIS.